US009223850B2

(12) United States Patent
Chen

(10) Patent No.: US 9,223,850 B2
(45) Date of Patent: Dec. 29, 2015

(54) DATA RETRIEVAL AND INDEXING METHOD AND APPARATUS

(75) Inventor: Langzhou Chen, Cambridge (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 369 days.

(21) Appl. No.: 13/264,845

(22) PCT Filed: Apr. 16, 2009

(86) PCT No.: PCT/GB2009/000977
§ 371 (c)(1),
(2), (4) Date: Jan. 17, 2012

(87) PCT Pub. No.: WO2010/119233
PCT Pub. Date: Oct. 21, 2010

(65) Prior Publication Data
US 2012/0109651 A1    May 3, 2012

(51) Int. Cl.
*G10L 15/00*    (2013.01)
*G06F 17/30*    (2006.01)

(52) U.S. Cl.
CPC ................. *G06F 17/30616* (2013.01)

(58) Field of Classification Search
CPC .............. G06F 17/30705; G06F 17/30616; G06F 17/30613; G06F 17/30619
USPC ................................ 704/240, 9, 10
See application file for complete search history.

(56) References Cited

U.S. PATENT DOCUMENTS

| | | | | |
|---|---|---|---|---|
| 6,026,388 | A * | 2/2000 | Liddy et al. | 1/1 |
| 6,360,215 | B1 * | 3/2002 | Judd et al. | 1/1 |
| 6,418,431 | B1 * | 7/2002 | Mahajan et al. | 1/1 |
| 2007/0165904 | A1 * | 7/2007 | Nudd et al. | 382/100 |
| 2008/0281857 | A1 * | 11/2008 | Dymetman | 707/102 |
| 2011/0295856 | A1 * | 12/2011 | Roitblat et al. | 707/737 |
| 2013/0262467 | A1 * | 10/2013 | Zhang et al. | 707/737 |

FOREIGN PATENT DOCUMENTS

| | | |
|---|---|---|
| JP | 2000-112949 A | 4/2000 |
| JP | 2000-137718 A | 5/2000 |

OTHER PUBLICATIONS

Japanese Office Action issued Aug. 20, 2013 in Patent Application No. 2012-505214 with English Translation.
Baeza-Yates, R., et al., "Modern Information Retrieval, Chapter 2: Modeling," Modern Information Retrieval, pp. 14-71, (Jan. 1, 1999) XP002299413.

(Continued)

*Primary Examiner* — Jakieda Jackson
(74) *Attorney, Agent, or Firm* — Oblon, McClelland, Maier & Neustadt, L.L.P.

(57) ABSTRACT

A method of searching a plurality of data files, wherein each data file includes a plurality of features. The method: determines a plurality of feature groups, wherein each feature group includes n features and n is an integer of 2 or more; expresses each data file as a file vector, wherein each component of the vector indicates the frequency of a feature group within the data file, wherein the n features which constitute a feature group do not have to be located adjacent to one another; expresses a search query using the feature groups as a vector; and searches the plurality of data files by comparing the search query expressed as a vector with the file vectors.

21 Claims, 3 Drawing Sheets

(56) References Cited

OTHER PUBLICATIONS

Fagan, J. L., "The Effectiveness of a Nonsyntactic Approach to Automatic Phrase Indexing for Document Retrieval," Journal of the American Society for Information Science, vol. 40, No. 2, pp. 115-132, (Mar. 1989) XP002553020.

International Search Report Issued Nov. 12, 2009 in PCT/GB09/000977 Filed Apr. 16, 2009.

* cited by examiner

… (1)

DATA RETRIEVAL AND INDEXING METHOD AND APPARATUS

FIELD OF THE INVENTION

The present invention relates to the field of data retrieval and indexing, more specifically the present invention is concerned with a linear semantic method which can be used in text searching, speech processing, image processing etc.

BACKGROUND

Data representation methods are known which represent an object as a collection of independent items disregarding the relationship and structure between the items. An example of such a method is the so-called "bag-of-words" (BoW) method.

The bag-of-words method has been widely used in natural language processing (NLP) where the data'object is provided by the text documents and the items are an unordered collection of words which occur in the documents. It is also used in the computer vision area, where the data object is an image and the items are codewords from a codebook.

The BoW method expresses the document as a bunch of individual words. However, the bag of words may not sufficiently express the semantic information sufficiently. For example, if there is a document containing the date "September 11", neither "September" nor "11" correctly conveys the real information of the document. If the BoW method is used to select similar documents, many unrelated documents such as "oceans eleven" or "black September" are selected. Meanwhile, because of polysemy, a word may lead to some semantic ambiguity. For example, "curry" can be a kind of food or the name of an IT shop. This kind of ambiguity influences the performance of BoW type analysis.

SUMMARY OF THE INVENTION

The proposed method attempts to address the weakness of the BoW method mentioned above by expressing text as a group of word pairs, disregarding the order of the word pairs. This method will hereinafter be referred to as bag-of-wordpairs (BoWP). The motivation of BoWP is that word pairs contain more semantic information than words, therefore expressing the text as a group of word pairs or even larger word groups, it is possible to catch more accurate semantic information.

Thus, in first aspect, the present invention provides a method of searching a plurality of data files, wherein each data file comprises a plurality of features;
  determining a plurality of feature groups, wherein each feature group comprises n features and n is an integer of 2 or more;
  expressing each data file as a file vector with components of the vector indicating the frequency of a feature group within the data file, wherein the n features which constitute a feature group do not have to be located adjacent to one another;
  expressing a search query using said feature groups as a vector;
  and searching said plurality of data files by comparing the search query expressed as a vector with said file vectors.

The proposed method extends the traditional BoW method to represent the object as an unordered collection of item pairs or groups. It is important to note that the features within the feature group do not have to be located next to each other or provided in any particular order. By doing so, in the domain of NLP and language modelling, more complicated semantic information in the text can be modelled.

The present invention may be applied to a plurality of fields, for example Natural language processing (NLP), Information retrieval (IR), document classification, computer vision, language modelling, speech recognition, speech-to-speech translation, OCR, handwriting recognition, or other applications using statistical language model information.

The data files may be selected from documents, corpus for speech processing, image data files, telemetric data from machines or any monitoring device, measurements, records or meter reading.

Generally, the feature group will be a feature pair. The feature may be a word, phrase, codeword in an image etc.

The search query may be expressed as a file vector itself. For example, the components of the search query vector are the same as those of the file vectors.

The comparison may be performed by determining the separation between the file vector of the search query and the file vectors of the data files. The cosine of the angle between the two vectors may be calculated to quantify this separation.

It is also possible to express the search query as a feature group vector where the components of the feature group vector indicate the occurrence of the feature group in a document.

It is also possible to compare two feature group vectors. Thus two feature group vectors maybe constructed using the occurrence of each feature group over documents/data files.

Thus, in a second aspect, the present invention provides a method of searching a plurality of data files, wherein each data file comprises a plurality of features;
  determining a plurality of feature groups, wherein each feature group comprises n features and n is an integer of 2 or more;
  expressing each feature group as a feature group vector with components of the vector indicating data files where the feature group occurs, wherein the n features which constitute a feature group do not have to be located adjacent to one another in a data file;
  expressing a search query using said feature groups as a vector;
  and searching said plurality of data files by comparing the search query expressed as a vector with said feature group vectors.

The above may also be used for document and data clustering. Also, the above may also be used for word clustering based on this measurement, the synonymy and polysemy can be detected.

Often, there will be many feature groups. Thus, in a preferred embodiment, determining a plurality of feature groups comprises pruning feature groups from all possible feature groups on the basis of association between the features in said feature groups.

Determining a plurality of feature groups may also comprise removing feature groups which contain features which are repeated frequently in the data file. For example, if the data file is a text document and the features are words, removing words such as "a" or "the" will yield better results.

In a preferred embodiment, the file vectors are arranged in a matrix to provide lateral semantic analysis (LSA) method. Said matrix may be factorised by a technique such as SVD.

The above method may be used for building a domain dependent statistical language model (LM) for ASR, the LM can catch more semantic information of the target domain.

Thus, in a third aspect, the present invention provides a method of selecting training corpora for processing speech relating to a specific subject matter, the method comprising:

providing a plurality of general training corpora;
inputting at least one data file relating to the specific subject matter; and
searching the plurality of general training corpora for corpus relating to the subject matter using the method according to the first aspect of the invention, wherein the search query is the data file relating to the specific subject matter and the plurality of data files to be searched are the plurality of general training corpora.

Thus, in a fourth aspect, the present invention provides a method of speech processing comprising selecting a training corpora as described above; training a language model for speech processing using said selected corpora; and processing speech using said language model.

The above speech processing may be applied to automatic speech recognition (ASR) where an input speech signal is output as a text data file or it may be applied to text-to-speech systems where input text is converted into an audio speech file.

The training of language model using the above may also be applied to handwriting recognition, OCR etc.

A language model trained using a method which selects documents on the basis of feature groups may also be combined with a language model trained using other documents. Such a method will allow the mixture between the complex semantic information captured using feature groups and other methods to be realised.

Thus, training said language model may comprise
training a first language model using the training corpora selected as described above;
training a second language model using a training corpora selected according to a different method; and
interpolating said first and second language models.

Said different method may be provided by the known bag-of-words method thus the training corpora for said second language model may be selected by providing a plurality of general training corpora;
inputting at least one data file relating to the subject matter of the speech processing method;
expressing each corpus in the corpora as a file vector with components of the vector indicating the frequency of each word within the corpus,
expressing the data file relating to the subject matter of the speech processing method in the same form as said file vectors; and searching said corpora by comparing the search query expressed as a vector with said file vectors.

The above has explained how a language model may be improved by optimising the training corpus using selection techniques based on feature groups. However, it is also possible to use semantic methods to actually train the language model.

Thus, training the language model may further comprise:
expressing the probability of a current word $w_i$ in a language model as:

$$P(w_i \mid h, d) = \frac{P(w_i, d \mid h)}{\sum_w P(w, d \mid h)}$$

where d is a document, h is the word history and:

$$P(w_i, d \mid h) = P(w_i \mid h) \cdot P(d \mid w_i, h) \approx P(w_i \mid h) \cdot P(d \mid w_i)$$

such that $$P(w_i, \mid h, d) = \frac{P(w_i \mid h) \frac{P(w_i \mid d)}{P(w_i)}}{\sum_w P(w \mid h) \frac{P(w \mid d)}{P(w)}}$$

and deriving $p(w_i \mid d)$ by comparing a vector constructed for the document by expressing the document as a file vector, the components of said file vector indicating the occurrence of words in said corpus with a vector constructed for the word.

Thus, the above uses bag-of-word techniques when training the language model of the type pioneered by J. R. Bellegarda "Exploiting Latent Semantic Information in Statistical language modelling" Proc. IEEE, vol. 88 no. 8, pp. 1279-1296, 2000.

However, the technique may also be applied using feature group techniques wherein training the language model further comprises:
expressing the probability of a current word $w_i$ in a language model as:

$$P(w_i \mid h, d) = \frac{P(w_i, d \mid h)}{\sum_w P(w, d \mid h)}$$

where d is a document, h is the word history and:

$$P(w_i, d \mid h) = P(w_i \mid h) \cdot P(d \mid w_i, h) \approx P(w_i \mid h) \cdot P(d \mid w_i)$$

such that $$P(w_i \mid h, d) = \frac{P(w_i \mid h) \frac{P(w_i \mid d)}{P(w_i)}}{\sum_w P(w \mid h) \frac{P(w \mid d)}{P(w)}}$$

and deriving $p(w_i \mid d)$ by comparing a vector constructed for the document expressing the document as a file vector with components of the vector indicating the frequency of feature groups within the corpus.

In a fifth aspect, the present invention provides a method of indexing data files, wherein each data file comprises a plurality of features, the method comprising:
determining a plurality of feature groups, wherein each feature group comprises n features and n is an integer of 2 or more; and
expressing each data file as a file vector where each component of the vector indicates the frequency of a feature group within the data file, wherein the n features which constitute a feature group do not have to be located adjacent to one another,
wherein each file vector provides an index for said data file.

Thus, the present invention also provides an improved database. Therefore, in a sixth aspect, the present invention provides a database comprising a plurality of data files, wherein each data file comprises a plurality of features and an index, each index comprising a file vector where each component of the vector indicates the frequency of a feature group within the data file and each feature group comprises n features where n is an integer of 2 or more, the n features which constitute a feature group do not have to be located adjacent to one another.

In a seventh aspect, the present invention provides an apparatus for searching a plurality of data files, wherein each data file comprises a plurality of features, the apparatus comprising a processor configured to:
determine a plurality of feature groups, wherein each feature group comprises n features and n is an integer of 2 or more;
express each data file as a file vector with components of the vector indicating the frequency of a feature group within the data file, wherein the n features which constitute a feature group do not have to be located adjacent to one another;
express a search query using said feature groups as a vector;
and search said plurality of data files by comparing the search query expressed as a vector with said file vectors.

In a eighth aspect, the present invention provides a speech processing apparatus, comprising:
a processor configured to
select training corpora;
train a language model for speech processing using said selected corpora; and
process speech using said language model,
wherein selecting training corpora comprises:
inputting at least one data file relating to the subject matter of the speech to be processed;
expressing each corpus in the corpora as a file vector with components of the vector indicating the frequency of each word group within the corpus, wherein each word group comprises n words and n is an integer of at least 2;
expressing the data file relating to the subject matter of the speech processing method in the same form as said file vectors; and searching said corpora by comparing the search query expressed as a vector with said file vectors.

The present invention can be implemented either in hardware or on software in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

The present invention will now be described with reference to the following non-limiting embodiments in which:

DETAILED DESCRIPTION

Figure 1:
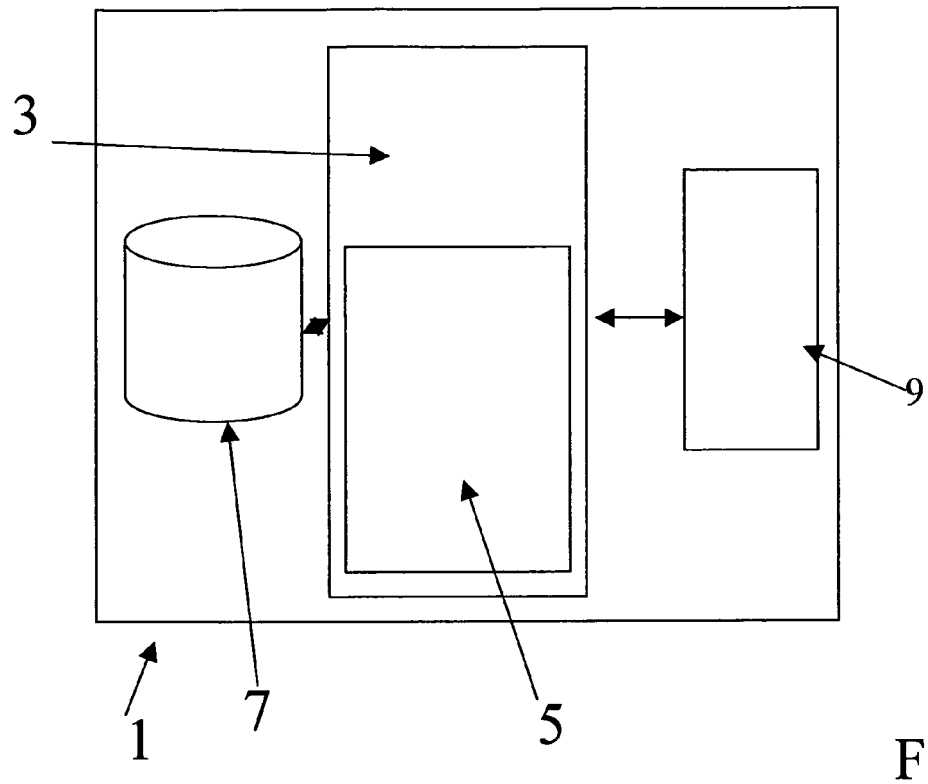
FIG. 1 is a schematic of a system which may be used with a method in accordance with an embodiment of the present invention.

FIG. 1 is a schematic of a data search or indexing system. The system 1 comprises a processor 3 which executes a program 5. Data system 1 further comprises storage 7. The storage 7 stores a plurality of data files which are indexed and searched by program 5. The data system 1 further comprises an input/output module 9. The input/output module 9 provides an interface to the processor. A search query may be input via a keyboard, network, external storage media, audio input etc. The results may be output visually or provided as a data file.

Method and apparatus in accordance with the present invention provide an improvement on the known "Bag-of-Words" method. Therefore, to understand the invention, a description of the prior art "bag-of-words" method follows.

In this method, text (such as a sentence, paragraph etc) is represented as an unordered collection of words, disregarding grammar and even word order. The term "document" is used to encompass text of any length from a phrase to a book. The BoW model is a dictionary-based model. Each document is treated like a "bag" (thus the order is not considered) which contains some words from the dictionary. For example, suppose that there are 2 simple text documents

"I WANT TO BUY TEN PIECES OF SUSHI AND TAKE THEM HOME"

"IT INCLUDES SUSHI SOUP AND FRUIT"

Based on these two text documents, a dictionary is constructed as:

[1 "I", 2 "IT", 3 "OF", 4 "TO", 5 "FRUITS", 6 "WANT", 7 "SOUP", 8 "SUSHI", 9 "PIECES", 10 "HOME", 11 "AND", 12 "BUY", 13 "TAKE", 14 "THEM", 15 "TEN", 16 "INCLUDES"]

which has 16 distinct words. And using the indices of the dictionary, each document is represented by a 16-entry vector:

[1,0,1,1,0,1,0,1,1,1,1,1,1,1,1,0]

[0,1,0,0,1,0,1,1,0,0,1,0,0,0,0,1]

A typical Bag-of-words method is latent semantic analysis (LSA). LSA can use a word-document matrix which describes the occurrences of words in documents; this is a sparse matrix whose rows correspond to items or terms and whose columns correspond to documents. Given a vocabulary with M words and a training corpus τ with N documents, a word document matrix A is constructed. Each document is associated with a column vector of dimension M and each word is associated with a row vector of dimension N as shown below

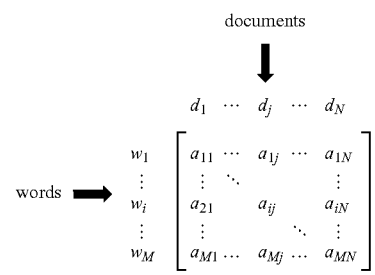

In the word document matrix A, the value of every cell corresponds to some suitable function of the word count. The number of times each word appears in each document, the word count, is usually normalised by the document length and word entropy. A suitable expression for the (i,j) cell of A is $$a_{ij} = (1 - \varepsilon_i)\frac{c_{i,j}}{n_j}$$

Where $c_{i,j}$ is the number of times word $w_i$ occurs in document $d_j$
$n_j$ is the total number of words present in $d_j$
$\varepsilon_i$ is the normalized entropy of $w_i$ in the corpus
$\varepsilon_i$ can be calculated as:

$$\varepsilon_i = -\frac{1}{\log N} \sum_{j=1}^{N} \frac{c_{i,j}}{t_i} \log \frac{c_{i,j}}{t_i}$$

where $t_i$ the total number of times word $w_i$ occurs in the whole corpus $\tau$ Where the (M×N) word document matrix A defines 2 vector representations for the words and the documents. Each word $w_i$ can be uniquely associated with a row vector of dimension N, and each document $d_j$ can be uniquely associated with a column vector of dimension M. Unfortunately, these vector presentations are impractical for 3 reasons. First the dimensions M and N can be extremely large; second, the vectors $w_i$ and $d_j$ are very sparse; third, the two spaces are distinct from one other.

To address this problem, singular value decomposition (SVD) is carried out. Only keeping the R biggest singular values and associated singular vectors, the SVD of the matrix A can be expressed as:

$$A \approx \tilde{A} = USV^T \quad (1)$$

Where S is the (R×R) diagonal matrix of singular values, U is the (M×R) left singular matrix with row vectors $u_i$ (1≤i≤M), and V is (N×R) right singular matrix with row vectors $v_j$ (1≤j≤M). $\tilde{A}$ is the R-rank best approximation of original word document matrix A. It keeps the major structure of A and ignores the high order information. $^T$ is the matrix transposition.

In Eqn (1), the column vectors of U and V define an orthonormal basis for the space of dimension R separately. Therefore, the word vector in A is projected onto the orthonormal basis of the column vector of matrix V, meanwhile, the document vector in A is projected onto the orthonormal basis of the column vector of matrix U. Based on this fact, each word in the word-document matrix can be expressed as a row vector of matrix US and each document can be expressed as a row vector of matrix VS, i.e. the word $w_i$ can be expressed as a R-dimension vector $u_iS$ and a document $d_j$ can be expressed as a R-dimension vector $v_jS$ in LSA space. The dimension of the row vector of matrix US is R, which is much smaller than the original size of vocabulary M, meanwhile, the dimension of the row vector of row vector of VS is also R, which is much smaller than the original document number N.

Since the words are expressed as a vector in LSA space, the similarity between 2 words can be calculated as the cosine of the angle between their feature vectors in LSA space, i.e.

$$Sim(w_i, w_j) = \frac{u_i S^2 u_j}{\|u_i S\|\|u_j S\|} \quad (2)$$

In the same way, the similarity between 2 documents can be calculated as:

$$Sim(d_i, d_j) = \frac{v_i S^2 v_j}{\|v_i S\|\|v_j S\|} \quad (3)$$

Suppose that there is a new document, which can be expressed as $\tilde{d}_p$, an extra column vector of matrix A. This new document can also be converted to a feature vector in LSA space as:

$$\tilde{v}'_p = \tilde{d}_p^T \quad (4)$$

In the LSA space, the semantic association between word and documents can also be calculated by the cosine of the angle of 2 vectors as:

$$K(w_i, d_j) = \cos(u_i S^{1/2}, v_j S^{1/2}) = \frac{u_i S v_j^T}{\|u_i S^{1/2}\|\|v_j S^{1/2}\|} \quad (5)$$

The above shows that BoW LSA feature space provides a very powerful tool to analyze the relations between words, documents, or word and document.

The above known method has also been used in speech processing. The task of statistical speech recognition is to find the word sequence with the maximum a posterior probability, $\hat{W}$, from the observed speech frame X via Bayes decision rule, i.e.

$$\hat{W} = \underset{W}{\operatorname{argmax}} p(W \mid X) = \underset{W}{\operatorname{argmax}} p(X \mid W) p(W) \quad (6)$$

The role of the LM is providing the prior probability of the word sequence W. Conventional statistical speech recognisers use n-gram LMs which assume that the probability of each word depends on the previous n−1 words in the sequence, i.e.

$$p(W) = \prod_{i=1}^{N} p(w_i \mid w_1 \ldots w_{i-1}) \approx \prod_{i=1}^{N} p(w_i \mid w_{i-n+1} \ldots w_{i-1}) \quad (7)$$

Semantic language models which incorporate more semantic knowledge into the statistical language model have also been tried. As mentioned above, LSA can be used in semantic language modelling Given the n-gram history and a document d which contains the semantic information, the probability of the current word can be expressed as:

$$P(w_i \mid w_{i-n+1}^{i-1}, d) = \frac{P(w_i, d \mid w_{i-n+1}^{i-1})}{\sum_w P(w, d \mid w_{i-n+1}^{i-1})} \quad (8)$$

Meanwhile, $$P(w_i, d \mid w_{i-n+1}^{j-1}) = P(w_i \mid w_{i-n+1}^{j-1}) \cdot P(d \mid w_i, w_{i-n+1}^{j-1}) \quad (9)$$

$$\approx P(w_i \mid w_{i-n+1}^{j-1}) \cdot P(d \mid w_i)$$

Therefore, Eqn 8 can be rewritten as:

$$P(w_i \mid w_{i-n+1}^{j-1}, d) = \frac{P(w_i \mid w_{i-n+1}^{j-1}) \frac{P(w_i \mid d)}{P(w_i)}}{\sum_w P(w \mid w_{i-n+1}^{j-1}) \frac{P(w \mid d)}{P(w)}} \quad (10)$$

In Eqn 10, the calculation of $p(w_i|d)$ is based on the closeness between the feature vectors of word $w_i$ and document d in LSA feature space which is shown in Eqn 5. Some method needs to be adopted to map the distance between 2 vectors to a probability. Possible methods are explained in J. R. Bellegarda "Exploiting Latent Semantic Information in Statistical language modelling" Proc. IEEE, vol. 88 no. 8, pp. 1279-1296, 2000.

Figure 2:
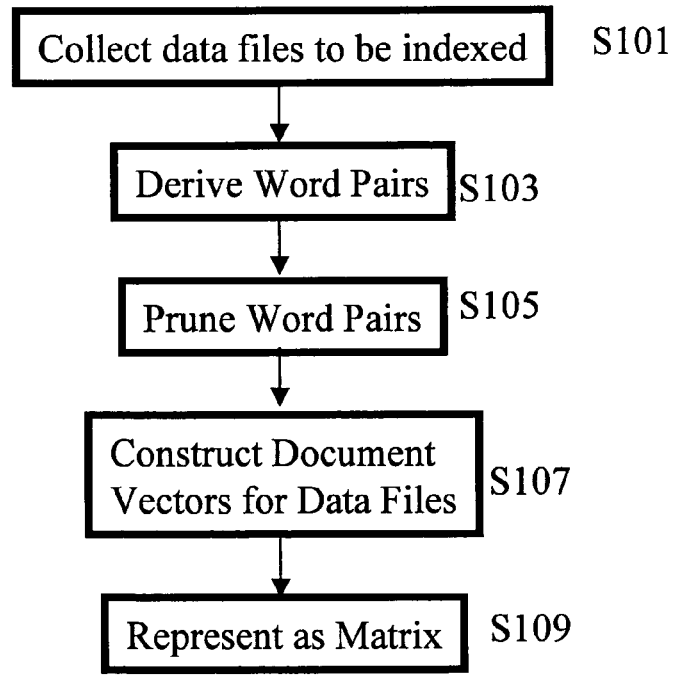
FIG. 2 is a flow chart of a document indexing method in accordance with an embodiment of the present invention.

FIG. 2 is a flow chart illustrating an indexing method in accordance with an embodiment of the present invention.

First, in step S101, data files which are to be indexed using the method will be collected. For example, if this system is to be used for document retrieval, the documents which are to be searched will be indexed in this manner.

Next, in step S103, word pairs are derived. These word pairs are then stored. Using the above example, take two simple text documents:

Document 1 "I WANT TO BUY TEN PIECES OF SUSHI AND TAKE THEM HOME"

Document 2 "IT INCLUDES SUSHI SOUP AND FRUIT"

Based on these two text documents, the following word pairs may be identified.

[1 "BUY_NULL",2 "BUY_FRUITS",3 "BUY_HOME",4 "BUY_I",5 "BUY_INCLUDES",6 "BUY_PIECES",7 "BUY_SOUP",8 "BUY_SUSHI",9 "BUY_TAKE",10 "BUY_TEN",11 "BUY_THEM",12 "BUY_WANT",13 "FRUITS_NULL",14 "FRUITS_HOME",15 "FRUITS_I",16 "FRUITS_INCLUDES",17 "FRUITS_PIECES",18 "FRUITS_SOUP",19 "FRUITS_SUSHI",20 "FRUITS_TAKE",21 "FRUITS_TEN",22 "FRUITS_THEM",23 "FRUITS_WANT",24 "HOME_NULL",25 "HOME_I",26 "HOME_INCLUDES", 27 "HOME_PIECES",28 "HOME_SOUP",29 "HOME_SUSHI",30 "HOME_TAKE",31 "HOME_TEN",32 "HOME_THEM",33 "HOME_WANT",34 "INCLUDES_NULL",35 "INCLUDES_PIECES",36 "INCLUDES_SOUP",37 "INCLUDES_SUSHI",38 "INCLUDES_TAKE",39 "INCLUDES_TEN",40 "INCLUDES_THEM",41 "INCLUDES_WANT",42 "I_NULL",43 "I_INCLUDES",44 "I_PIECES",45 "I_SOUP",46 "I_SUSHI",47 "I_TAKE",48 "I_TEN",49 "I_THEM",50 "I_WANT",51 "PIECES_NULL",52 "PIECES_SOUP",53 "PIECES_SUSHI",54 "PIECES_TAKE",55 "PIECES_TEN",56 "PIECES_THEM",57 "PIECES_WANT",58 "SOUP_NULL",59 "SOUP_SUSHI",60 "SOUP_TAKE",61 "SOUP_TEN",62 "SOUP_THEM",63 "SOUP_WANT",64 "SUSHI_NULL", 65 "SUSHI_TAKE",66 "SUSHI_TEN",67 "SUSHI_THEM",68 "SUSHI_WANT",69 "TAKE_NULL", 70 "TAKE_TEN",71 "TAKE_THEM",72 "TAKE_WANT", 73 "TEN_NULL",74 "TEN_THEM",75 "TEN_WANT",76 "THEM_THEM",77 "THEM_WANT",78 "WANT_NULL"]

The above has 78 distinct word pairs. Thus each document may be represented by a 78-entry vector:

[1,0,1,1,0,1,0,1,1,1,1,1,0,0,0,0,0,0,0,0,0,0,0,1,1,0,1,0,1,1, 1,1,1,0,0,0,0,0,0,0,0,1,0,1,0,0,0,0,0,0,1, 0,1,1,1,1,1,0, 0,0,0,0,0,1,1,1,1,1,1,1,1,1,1,1,1,1,1]

[0,0,0,0,0,0,0,0,0,0,0,1,0,0,1,0,1,1,0,0,0,0,0,0,0,0,0,0, 0,0,0,1,0,1,1,0,0,0,0,0,0,0,0,0,0,0,0, 0,0,0,0,0,0,1, 1,0,0,0,0,1,0,0,0,0,0,0,0,0,0,0,0]

In principle, all of the possible word pairs in all of the documents could be collected in the word pairs dictionary and vectors calculated with components corresponding to the number of Word pairs. However, the number of possible word pairs is too big. Therefore it is desirable to prune the number of word pairs. To reduce the number of word pairs, the word pairs selected should be strongly associated together. There are some widely used methods to calculate the association between 2 words, for example the average mutual information (AMI) which can be expressed as:

$$AMI(w_i, w_j) = p(w_i, w_j)\log\frac{p(w_j \mid w_i)}{p(w_j)} + p(w_i, \overline{w}_j)\log\frac{p(\overline{w}_j \mid w_i)}{p(\overline{w}_j)} + \quad (11)$$

$$p(\overline{w}_i, w_j)\log\frac{p(w_j \mid \overline{w}_i)}{p(w_j)} + p(\overline{w}_i, \overline{w}_j)\log\frac{p(\overline{w}_j \mid \overline{w}_i)}{p(\overline{w}_j)}$$

Where $p(w_i, \overline{w}_j)$ means the probability of occurring $w_i$ but without $w_j$ in a document.

The association between 2 words can also be calculated using a LSA based on BoW method. As described in section 6a, in the BoW based LSA feature space, if the feature vectors of 2 words are close, it means that these 2 words occur in same document frequently. Therefore Eqn 2 can be used to measure the association of 2 words.

Meanwhile, the general words such as {"a","the"} do not contain plenty of semantic information. Therefore, the word pairs which contain the general words should not be selected. The generalisation of a word can be measured using inverse document frequency (IDF) value.

Based on the discussion above, given a document d, the corresponding word pairs are selected as WORDPAIR($d$)={$w_1,w_2 \mid w_1 \in d, w_2 \in d, idf(w_1) > \alpha, idf$
$(w_2) > \alpha, \text{association}(w_1, w_2) > \beta$} (12)

Where association($w_1$, $w_2$) is a certain measurement of association of 2 words, it can be the AMI, distance of feature vectors of 2 words in BoW feature space or other measurements. The $\alpha$ and $\beta$ are empirical thresholds.

Based on the above example of 2 short documents:
"I WANT TO BUY TEN PIECES OF SUSHI AND TAKE THEM HOME"
"IT INCLUDES SUSHI SOUP AND FRUIT"

before the word pair pruning, there are 78 entries in the dictionary of BoWP. After pruning, the dictionary contains only 16 entries as follow:

[1 "BUY_NULL",2 "BUY_INCLUDES",3 "BUY_PIECES",4 "FRUITS_NULL",5 "FRUITS_PIECES",6 "FRUITS_SOUP",7 "FRUITS_SUSHI",8 "INCLUDES_NULL",9 "INCLUDES_PIECES",10 "INCLUDES_SUSHI",11 "PIECES_NULL",12 "PIECES_SOUP",13 "PIECES_SUSHI",14 "SOUP_NULL",15 "SOUP_SUSHI",16 "SUSHI_NULL"]

Thus using the pruned word pairs of step S105, each document is represented by a 16-component vector:
[1,0,1,0,0,0,0,0,0,0,1,0,1,0,0,1]
[0,0,0,1,0,1,1,1,0,1,0,0,0,1,1,1]

A co-occurrence matrix of word pairs and documents is then constructed in step S109. Each column of the matrix represents a document and each row of the matrix is associated to a word pair. The co-occurrence matrix of word pairs and the documents is shown below:

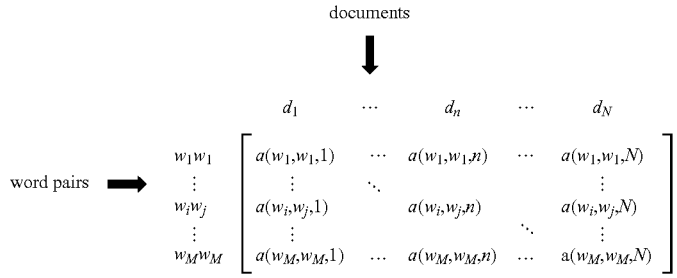

In the above co-occurrence matrix, the cell $a(w_i,w_j,n)$ represents the normalized frequency of word pair "$w_i,w_j$" occurred in document n, i.e.

$$a(w_i, w_j, n) = (1 - \varepsilon(w_i, w_j)) \cdot \frac{C(w_i, w_j, n)}{\sum_{w,v \in D_n} C(w, v, n)} \quad (13)$$

Where $\epsilon(w_i,w_j)$ is the normalized entropy for "$w_i,w_j$", i.e.

$$\varepsilon(w_i, w_j) = -\frac{1}{\log N} \sum_{n=1}^{N} \frac{C(w_i, w_j, n)}{C(w_i, w_j, n)} \log \frac{C(w_i, w_j, n)}{\sum_n C(w_i, w_j, n)} \quad (14)$$

Given the wordpair and document co-occurrence matrix $\hat{A}$, a SVD operation is carried out to generate a LSA feature space of BoWP, i.e.

$$\hat{A} \approx \tilde{\hat{A}}_P = \hat{U}\hat{S}\hat{V} \quad (15)$$

In Eqn 10 $\hat{S}$ is a R×R diagonal matrix, of the R biggest singular values. $\hat{U}$ and $\hat{V}$ are the left and right singular vectors respectively.

In the LSA feature space of the BoWP, each row vector of matrix $\hat{U}\hat{S}$ represented a word pair in LSA space, i.e.

$$\bar{u}(w_i,w_j) = \hat{u}_{row(w_i,w_j)} \hat{S} \quad (16)$$

Where row($w_i,w_j$) represented the row number of word pair "$w_i,w_j$" in the wordpair document co-occurrence matrix. Meanwhile, each document is still represented as a column vector of matrix $\hat{S}\hat{V}$.

Thus, the above describes how the data files which in the above example are documents can be indexed using the method in accordance with an embodiment of the present invention.

The above uses documents as data files, but data files may also be image data files, telemetric data from machines or any monitoring device, measurements, records or meter reading.

Thus, the above method may be used to index files in a database where the index is provided by the file vectors.

Figure 3:
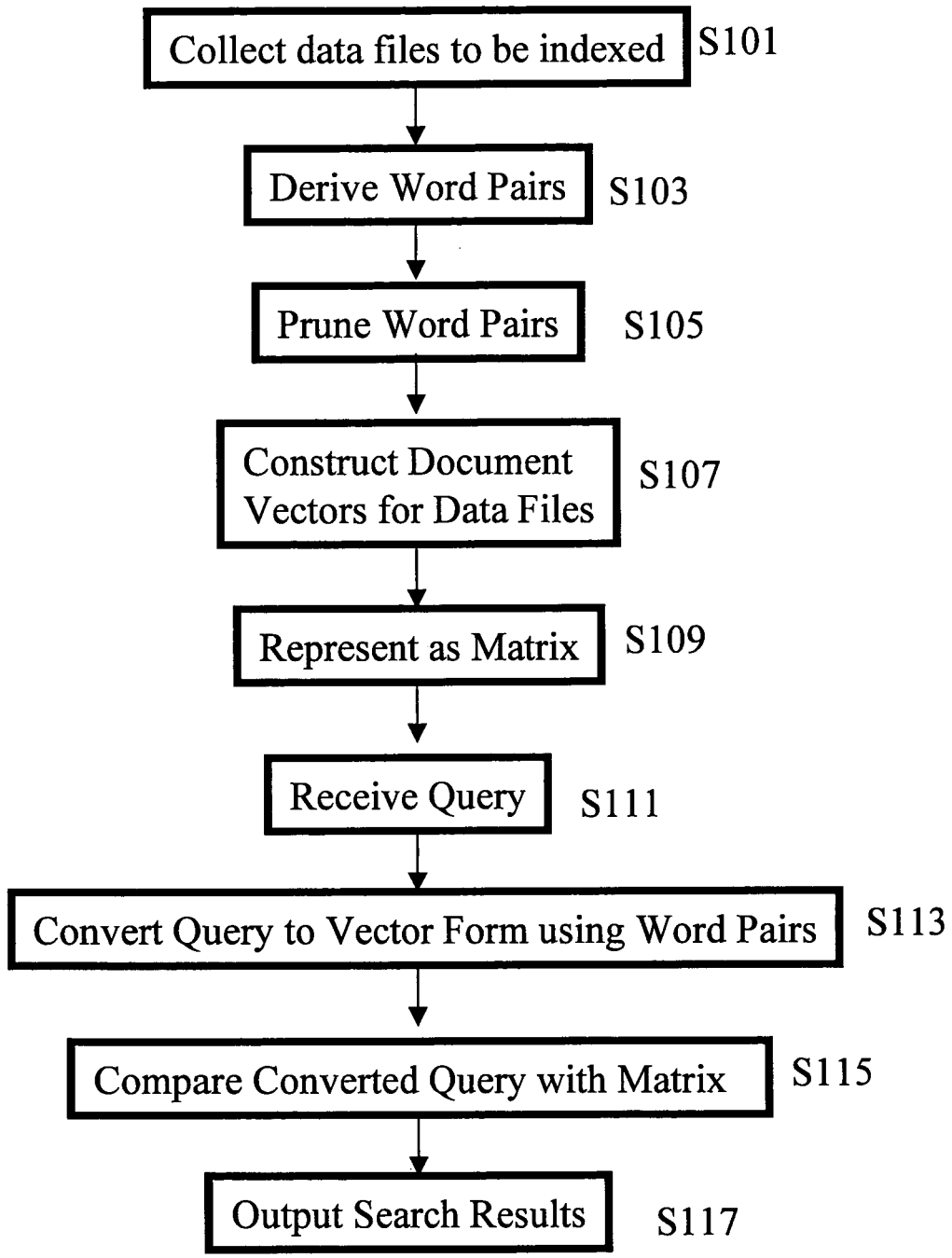
FIG. 3 is a flow chart of a search method in accordance with an embodiment of the present invention.

FIG. 3 shows a further method in accordance with an embodiment of the present invention where the data files are searched. To avoid any unnecessary repetition, like reference numerals will be used to denote like features.

In step S111, the system receives a search query. Examples of different types of search queries will be discussed later.

First, considering the case where the query is converted into the form of a document using step S113. A new document D can be represented as a feature vector in BoWB LSA as $$v(d) = \sum_{w_i \in d \&\& w_j \in d} C(w_i, w_j, d) \cdot \hat{u}_{row(w_i,w_j)}$$

This query which is now in the form of a document can be compared with the matrix. For example:

$$Sim(d_i, d_j) = \frac{v_i S^2 v_j}{\|v_i S\| \|v_j S\|} \quad (3)$$

The search results can then be output in step S117.

As previously explained, the above can also be used so that a document which is input in the form of a query can be compared with a word pair vector or a document which is input in the form of a word pair can be compared with the documents in the matrix in step S115.

It is also possible to compare word pairs using the above. Comparing word pairs has application for clustering and polysemy.

Two examples of the application of the BoWP are presented here.

Figure 4:
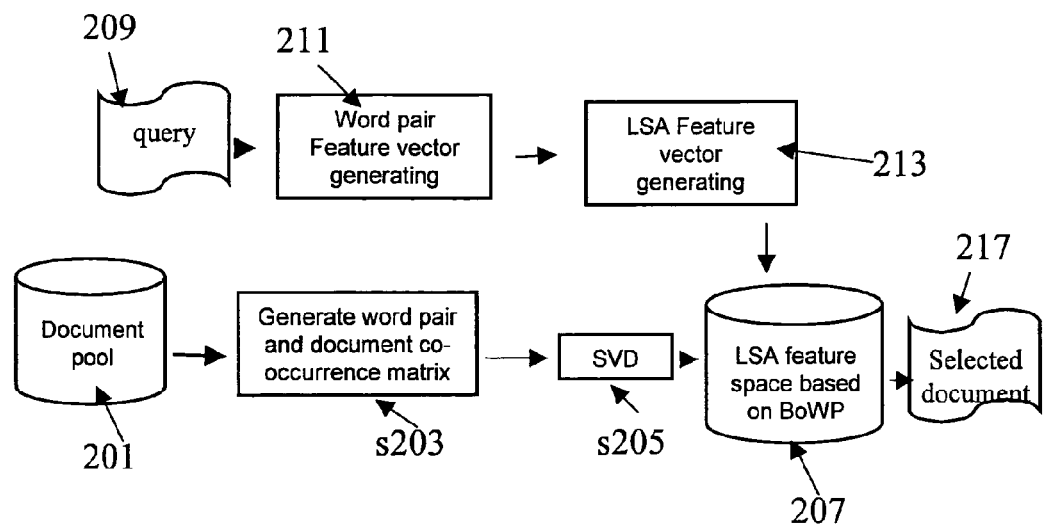
FIG. 4 is a document retrieval system in accordance with an embodiment of the present invention.

The first example is information retrieval IR. The framework of IR using BoWP is shown in FIG. 4. At first, the document pool 201 which contains large amount of documents are used to construct a word pair and document co-occurrence matrix as explained with reference to FIG. 2 and shown in step S203.

Then the SVD operation is carried out in step S205 in this word pair and document co-occurrence matrix to generate the LSA feature space 207 based on BoWP. In this feature space, each document in document pool is represented as a LSA feature vector.

Given a text query 209, a BoWP feature 211 is generated using the word pair dictionary. Then this BoWP feature is projected to the LSA feature space 213 as a new document vector. Then the documents in document pool 201 which match the topic of the query are selected based on the distance between their feature vectors and the feature vector 213 of query in LSA feature space 207 to output selected document 215.

The second application is domain dependent language modelling for Automatic speech recognition (ASR) or text-to-speech systems (TTS). Here, the BoWP method is used to select a specialised training corpus automatically from a large general corpus.

A corpus, which may be, for example, the test corpus which a user reads to train an ASR system, is used as query and the domain dependent corpus which has same semantic information as query is selected from general corpus. Then, the domain dependent corpus is used to train the LM for speech recognition.

Figure 5:
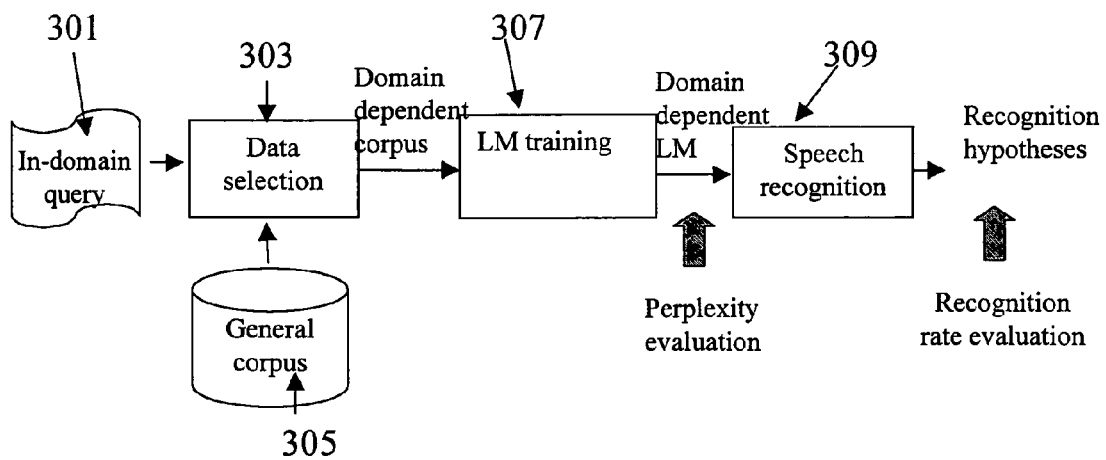
FIG. 5 is a speech processing system in accordance with an embodiment of the present invention.

The experiment framework is shown in FIG. 5. The data selection can be viewed as a process of information retrieval which is shown in FIG. 4. An in-domain query 301 is provided to perform selection of the domain dependent documents 303 from the general corpus 305. For example, if the domain or subject matter of the speech to be processed is "tourism", then in-domain training corpora which relate to tourism can be used as query Q to select the text corpus which has same domain information as query from a large general corpus.

The Language model 307 is then trained on the selected data 303. The LM is a standard language model and the training of such a model is well known to those skilled in the art and will not be repeated here. Typically an n-gram language model (LM) will be used as explained with reference to equations 6 to 10.

Once the model 307 has been trained it can be used in conjunction with an acoustic model in a speech recognition system 309.

To test the system, data selections are carried out using BoW method and BoWP method separately. Using the selected corpora based on different methods, two word based trigram LMs are trained:

$M_{BoW}$ which is the LM trained by corpus based on BoW data selection.

$M_{BoWP}$ which is the LM trained by corpus based on BoWP data selection

There are a number of ways of assessing the "goodness" of a LM. For the speech recognition purposes the recognition error rate achieved using a given LM is the most important criterion. Besides the recognition rate, the most common metric for evaluating a LM is cross-entropy or perplexity. Given a test set. W and a LM m, the cross-entropy between W and m is defined as $$H_m(W) = -\frac{1}{N}\log_2 p_m(W).$$

Where N is the length of test set and $p_m(W)$ is the probability of test set W calculated by LM m. If the test data is considered as the text emitted from an information source, the cross-entropy can be understood as how well the LM estimates the distribution of the text emitted from the information source. Given the text W, the perplexity of the LM m is defined as $PP_m(W)=2^{H_m(W)}$. From the definition, it can be found that the lower perplexity is better.

Two evaluations are carried out to compare the performances of BoW and BoWP. The first one is the perplexity comparison. $M_{BoW}$ and $M_{BoWP}$ are used to calculate the perplexity of the query Q. The lower perplexity indicates that the selected corpus match the query better. The results are shown in Table 1.

TABLE 1

The perplexity results based on different data selection methods.

| Method | Size of selected corpus | Perplexity |
|---|---|---|
| BoW | 254M words | 240.38 |
| BoWP | 107M words | 220.39 |

Table 1 showed that using the method of bag-of-wordpair, the size of selected corpus is only half of the one selected by bag-of-word method. While the perplexity results of mixture LMs based on bag-of-wordpairs is better than those based on bag-of-words. This result indicates that the bag-of-wordpairs method catch the semantic information more accurate than bag-of-words method.

The second experiment is ASR. Using the LMs mentioned above to do the speech recognition. The results are shown in Table 2

TABLE 2

The speech recognition results based on different data selection methods.

| LM | Word error rate | Sentence error rate |
|---|---|---|
| General LM (without data selection) | 43.7% | 74.4% |
| $M_{BoW}$ | 40.0% | 71.7% |
| $M_{BoWP}$ | 39.5% | 72.0% |
| $M_{BoW}$ + $M_{BoWP}$ | 37.7% | 70.0% |

In Table 2, the first row gave the results of the general LM. Because the domain mismatch between gigaword corpus and tourism is big, the general LM got very poor results. The second and the third row gave the results of BoW data selection LM and BoWP data selection LM respectively. The results showed that the LM based on semantic data selection can improve the recognition rate significantly. The LMs based BoW method and BoWP method got comparable results.

However, interpolating the LM with BoW data selection and the LM with BoWP data selection can achieve better results than the LM with BoW data selection only. It means that BoWP catches some complicated semantic information beyond the BoW method.

The LM which has been trained using data selected by the BoW method can be expressed as:

P(w|h,Data_BoW), i.e. the conditional probability of word w, given the n-gram history h, the selected training data based on BoW: Data_BoW.

The LM which has been trained using BoWP data selection can be expressed as: P(w|h,Data_BoWP).

These two LMs may be combined by linear interpolation, i.e. generate a new LM which can be expressed as λ×P(w|h,Data_BoW)+(1−λ)×P(w|h,Data BoWP)

where λ is the interpolation weight. The interpolation weight may be selected to maximise accuracy.

It is also possible to use the BoW or BoWP method directly when training the language model in equation 10 order to obtain a probability for $p(w_i|d)$ The above has described the use of language models in ASR, but language models are used and can be trained in the same way for TTS, OCR systems and handwriting recognition. The above may also be used in simultaneous translation systems.

Much of the above description has concentrated on the data files being documents or corpora and the features being words. However, the method described with reference to FIGS. 1 to 4 can be applied to many different types of data files, for example, images. In image processing, images are represented by codewords which correspond to code which represents an area of the image or a plurality of areas, these codewords form a codebook. The codewords may be treated as words in the above examples and the image files as documents.

The invention claimed is:

1. A method of searching a plurality of data files, wherein each data file includes a plurality of data items, the method comprising:
using a processor to:
select training corpora;
train a language model for speech processing using said selected corpora;
process speech using said language model,
wherein selecting training corpora includes:
inputting at least one data file relating to the subject matter of the speech to be processed;
determining a plurality of index items, wherein each index item includes a combination of n data items and n is an integer of 2 or more;
expressing each data file as a file vector with each component of the vector indicating the frequency of a different index item within the data file, wherein the index items to which the components of the vector correspond are the same for all data files, and wherein the n data items which constitute an index item do not have to be located adjacent to one another in a data file, and at least one index item includes data items from more than one data file; and
expressing a search query using said index items as a vector;
and search said plurality of data files by comparing the search query expressed as a vector with said file vectors.

2. The method according to claim 1, wherein the search query is expressed as a file vector.

3. The method according to claim 2, wherein said comparison is performed by determining the separation between the file vector of the search query and the file vectors of the data files.

4. The method according to claim 1, wherein said data files are selected from documents, corpus for speech processing, image data files.

5. The method according to claim 1, wherein n=2 such that each index item is a pair of data items.

6. The method according to claim 1, wherein determining a plurality of index items includes pruning index items from all possible index items on the basis of association between the data items in said index items.

7. The method according to claim 1, wherein determining a plurality of index items includes removing index items which contain data items which are repeated frequently in the data file.

8. The method according to claim 1, wherein the file vectors are arranged in a matrix, and said matrix is factorised.

9. A method of selecting training corpora to process speech relating to a specific subject matter, the method comprising:
providing a plurality of general training corpora;
inputting at least one data file relating to the specific subject matter; and
searching the plurality of general training corpora for corpus relating to the subject matter using the method according to claim 1, wherein the search query is the data file relating to the specific subject matter and the plurality of data files to be searched are the plurality of general training corpora.

10. A method of speech processing, the method comprising:
selecting a first training corpora according to claim 9;
training a language model for speech processing using said first selected corpora; and
processing speech using said language model.

11. The method of speech processing according to claim 10, wherein training said language model includes
training a first language model using said first training corpora;
training a second language model using a second training corpora selected according to a different method; and
interpolating said first and second language models.

12. The method of speech processing according to claim 11, wherein the training corpora for said second language model are selected by providing a plurality of general training corpora;
inputting at least one data file relating to the subject matter of the speech processing method;
expressing each corpus in the corpora as a file vector with components of the vector indicating the frequency of each word within the corpus,
expressing the data file relating to the subject matter of the speech processing method in the same form as said file vectors; and searching said corpora by comparing the search query expressed as a vector with said file vectors.

13. The speech processing method according to claim 10, wherein training the language model further includes:
expressing the probability of a current word $w_i$ in a language model as:

$$P(w_i \mid h, d) = \frac{P(w_i, d \mid h)}{\sum_w P(w, d \mid h)}$$

where d is a document, h is the word history and:

$$P(w_i, d \mid h) = P(w_i \mid h) \cdot P(d \mid w_i, h)$$
$$\approx P(w_i \mid h) \cdot P(d \mid w_i)$$

such that $$P(w_i \mid h, d) = \frac{P(w_i \mid h) \frac{P(w_i \mid d)}{P(w_i)}}{\sum_w P(w \mid h) \frac{P(w \mid d)}{P(w)}}$$

and deriving $p(w_i \mid d)$ by comparing a vector constructed for the document by expressing the document as a file vector, the components of said file vector indicating the occurrence of words in said corpus with a vector constructed for the word.

14. The speech processing method according to claim 10, wherein training the language model further includes:
expressing the probability of a current word $w_i$ in a language model as:

$$P(w_i \mid h, d) = \frac{P(w_i, d \mid h)}{\sum_w P(w, d \mid h)}$$

where d is a document, h is the word history and:

$$P(w_i, d \mid h) = P(w_i \mid h) \cdot P(d \mid w_i, h)$$
$$\approx P(w_i \mid h) \cdot P(d \mid w_i)$$

such that $$P(w_i \mid h, d) = \frac{P(w_i \mid h) \frac{P(w_i \mid d)}{P(w_i)}}{\sum_w P(w \mid h) \frac{P(w \mid d)}{P(w)}}$$

and deriving $p(w_i \mid d)$ by comparing a vector constructed for the document expressing the document as a file vector with components of the vector indicating the frequency of feature groups within the corpus.

15. A non-transitory computer-readable medium having computer-readable instructions thereon which when executed by a computer cause the computer to perform a method according to claim 1.

16. The method according to claim 1, wherein said index items are selected from words, phrases, or codewords in an image.

17. A method of searching a plurality of data files, wherein each data file includes a plurality of data items, said method comprising:
using a processor to:
select training corpora;
train a language model for speech processing using said selected corpora;
process speech using said language model,
wherein selecting training corpora includes:
inputting at least one data file relating to the subject matter of the speech to be processed;
determining a plurality of index items, wherein each index item includes a combination of n data items and n is an integer of 2 or more;
expressing each index item as an index item vector with each component of the vector indicating a different data file where the index item occurs, wherein the index items to which the components of the vector correspond are the same for all data files, and wherein the n data items which constitute an index item do not have to be located adjacent to one another in a data file, and at least one index item comprises data items from more than one data file; and
expressing a search query using said index items as a vector;
and search said plurality of data files by comparing the search query expressed as a vector with said index item vectors.

18. A method of indexing data files, wherein each data file includes a plurality of data items, the method comprising:
using a processor to:
select training corpora;
train a language model for speech processing using said selected corpora;
process speech using said language model,
wherein selecting training corpora includes:
inputting at least one data file relating to the subject matter of the speech to be processed;
determining a plurality of index items, wherein each index item includes a combination of n data items and n is an integer of 2 or more; and
expressing each data file as a file vector where each component of the vector indicates the frequency of a different index item within the data file, wherein the index items to which the components of the vector correspond are the same for all data files, and wherein the n data items which constitute an index item do not have to be located adjacent to one another in a data file, and at least one index item comprises data items from more than one data file,
wherein each file vector provides an index for said data file.

19. An apparatus for searching a plurality of data files, wherein each data file includes a plurality of data items, the apparatus comprising:
a processor configured to:
select training corpora;
train a language model for speech processing using said selected corpora;
process speech using said language model,
wherein selecting training corpora includes:
inputting at least one data file relating to the subject matter of the speech to be processed;
determining a plurality of index items, wherein each index item includes a combination of n data items and n is an integer of 2 or more;
expressing each data file as a file vector with each component of the vector indicating the frequency of a different index item within the data file, wherein the index items to which the components of the vector correspond are the same for all data files, and wherein the n data items which constitute an index item do not have to be located adjacent to one another in a data file, and at least one index item comprises data items from more than one data file; and
expressing a search query using said index items as a vector;
and search said plurality of data files by comparing the search query expressed as a vector with said file vectors.

20. A speech processing apparatus, comprising:
a processor configured to
select training corpora;
train a language model for speech processing using said selected corpora; and
speech using said language model,
wherein selecting training corpora includes:
inputting at least one data file relating to the subject matter of the speech to be processed;
expressing each corpus in the corpora as a file vector with components of the vector indicating the frequency of word groups within the corpus, wherein the word groups to which the components of the vector correspond are the same for each corpus, and wherein each word group includes n words and n is an integer of at least 2 and wherein the words in said word group do not have to be located adjacent to one another, and at least one index item comprises data items from more than one data file
expressing the data file relating to the subject matter of the speech processing method in the same form as said file vectors; and searching said corpora by comparing the search query expressed as a vector with said file vectors.

21. A non-transitory computer-readable medium having stored thereon computer-readable instructions which when executed by a computer cause the computer to perform a method, comprising:
selecting training corpora;
training a language model for speech processing using said selected corpora;
processing speech using said language model,
wherein selecting training corpora includes:
inputting at least one data file relating to the subject matter of the speech to be processed;
determining a plurality of index items, wherein each index item includes a combination of n data items and n is an integer of 2 or more;
expressing each data file as a file vector with each component of the vector indicating the frequency of a different index item within the data file, wherein the index items to which the components of the vector correspond are the same for all data files, and wherein the n data items which constitute an index item do not have to be located adjacent to one another in a data file, and at least one index item includes data items from more than one data file; and expressing a search query using said index items as a vector;

and searching said plurality of data files by comparing the search query expressed as a vector with said file vectors.

* * * * *